(12) United States Patent
Kent (10) Patent No.: US 9,051,192 B2
(45) Date of Patent: Jun. 9, 2015

(54) SURFACE WATER FILTRATION SYSTEMS (76) Inventor: Greg Kent, Oceanside, CA (US)

(*) Notice: Subject to any disclaimer, the term of this patent is extended or adjusted under 35 U.S.C. 154(b) by 217 days.

(21) Appl. No.: 13/556,222

(22) Filed: Jul. 24, 2012

(65) Prior Publication Data
US 2014/0027362 A1 Jan. 30, 2014

(51) Int. Cl.
E03F 5/04 (2006.01)
C02F 1/00 (2006.01)
C02F 1/28 (2006.01)
C02F 103/00 (2006.01)

(52) U.S. Cl.
CPC ............ C02F 1/004 (2013.01); E03F 5/041 (2013.01); C02F 1/288 (2013.01); C02F 2103/001 (2013.01); C02F 2301/043 (2013.01); E03F 5/0404 (2013.01)

(58) Field of Classification Search
CPC ....... E03F 5/0401; E03F 5/0404; E03F 5/041; E03F 5/14; E03F 5/16; C02F 1/004; C02F 1/28; C02F 1/288; C02F 2103/001; C02F 2301/043; B01D 35/02; B01D 2221/12
USPC ............. 210/85, 163, 164, 170.03, 254, 266, 210/434, 474; 404/4, 5
See application file for complete search history.

(56) References Cited

U.S. PATENT DOCUMENTS

| | | | |
|---|---|---|---|
| 5,788,849 A * | 8/1998 | Hutter et al. ................... 210/163 |
| 5,820,762 A * | 10/1998 | Bamer et al. ................... 210/163 |
| 6,106,706 A | 8/2000 | Roy et al. |
| 6,149,803 A | 11/2000 | DiLoreto et al. |
| 6,217,757 B1 * | 4/2001 | Fleischmann .................. 210/163 |
| 6,368,499 B1 * | 4/2002 | Sharpless ....................... 210/164 |
| 6,551,023 B2 | 4/2003 | Allard |
| 6,998,039 B2 | 2/2006 | Harris et al. |
| 7,112,274 B1 * | 9/2006 | Sanguinetti .................... 210/163 |
| 7,186,333 B2 | 3/2007 | Kluge |
| 7,276,156 B2 | 10/2007 | Lockerman et al. |
| 7,404,892 B2 | 7/2008 | Shaw et al. |
| 2005/0000872 A1 * | 1/2005 | Middleton et al. ............. 210/163 |
| 2008/0073277 A1 * | 3/2008 | Paoluccio et al. ............. 210/163 |
| 2009/0101553 A1 * | 4/2009 | Lucas ........................... 210/164 |
| 2011/0192775 A1 * | 8/2011 | Shaw et al. ............... 210/170.03 |

* cited by examiner

Primary Examiner — Christopher Upton (57) ABSTRACT

Certain embodiments of the invention provide systems that filter surface water runoff that enters sewer or storm drains. Some embodiments of such systems are composed of a top plate, a main filter chamber, and an enhanced media filter, and each of the top plate, the main chamber, and the enhanced media filter are shaped for mounting into a storm drain. In some embodiments, the top plate is shaped to overlap a perimeter of the sewer or storm drain hole and has a surface water intake opening. In some embodiments, the top plate, the main filter chamber, and the enhanced media filter are vertically arrayed, respectively, from top to bottom.

19 Claims, 14 Drawing Sheets

FIG. 1

Prior Art

Prior Art

SURFACE WATER FILTRATION SYSTEMS

FIELD OF THE INVENTIONS

Embodiments of the invention relate to water filtration systems configured to direct surface water runoff or flows (e.g., storm water runoff, construction site water runoff, and dry weather water flows), through sediment, silt, pollutant, debris, particulate, etc. capturing filters prior to watershed entry by such surface water runoff or flows.

BACKGROUND OF THE INVENTIONS

Surface waters that do not percolate into the ground may flow over a variety of substrates (e.g., paved or unpaved streets or lots, fertilized or mined land, and construction sites) and in so-doing accumulate substances (e.g., chemicals, debris, particulates, sediment, silt, and pollutants) that can adversely affect water quality of watershed systems into which they flow. The detrimental effects of unclean and/or contaminated surface water runoff are vast and well known; and have led to the creation of the Clean Water Act by the Federal Government and significant enforcement thereof by the Environmental Protection Agency (EPA). The EPA's National Pollutant Discharge Elimination System (NPDES) is authorized by the Clean Water Act and typically requires municipalities to implement controls and best management practices (BMPs) that reduce pollutants in surface water flows or discharges from municipal facilities, e.g., as identified in a storm water management plan prepared in accordance with 40 CFR Part 122.44(k)(2). NPDES also imposes standards regarding the content of sediments, nutrients, metals, organics, bacteria, and oils in surface waters that flow into storm or sewer drains.

One approach for improving surface water quality prior to its entry into natural watersheds through storm or sewer drains is filtration. A previous filtering device for use in storm or sewer drains is described in U.S. Pat. No. 7,186,333, by Kluge, the content of which is hereby incorporated by reference in its entirety.

SUMMARY OF THE INVENTIONS

Certain embodiments of the invention provide systems that filter surface water runoff that enters sewer or storm drains. Some embodiments of such systems are composed of a top plate, a main filter chamber, and an enhanced media filter, and each of the main chamber and the enhanced media filter are shaped for mounting into a storm drain. In some embodiments, the top plate is shaped to overlap a perimeter of the sewer or storm drain hole and has a surface water intake opening. In some embodiments, the top plate, the main filter chamber, and the enhanced media filter are vertically arrayed from top to bottom, respectively. Components of storm drain filter systems of the present invention may be constructed from metal, fiberglass, plastic, concrete, or similar materials, or combinations thereof.

In some embodiments, the main filter chamber comprises two or more vertically tiered filters and is configured to channel surface water that has passed through the surface water intake opening of the top plate through the two or more filters, which can be made of perforated metal or wire mesh and operative to provide graduated filtration of particulate materials and large debris out of the surface water that flows therethrough.

In some embodiments, the enhanced media filter comprises at least one layer of a solid state media or a granular media and is configured to channel surface water that has passed through the main filter chamber through the at least one solid state or granular layer, which is operative to remove from the surface water that flows therethrough substantial amounts of suspended or dissolved fine sediments, pollutants, metals, nutrients, bacteria, or combinations thereof. In some embodiments, the surface water that flows through the enhanced media filter of a surface water filter system of the invention meets NPDES quality requirements.

In some embodiments, the perimeter dimensions of a main chamber filter unit exactly or substantially match the perimeter dimensions of an enhanced media filter unit in a surface water filter system of the invention.

In some embodiments, the top plate, the main filter chamber, and the enhanced media filter of a surface water filtration system of the invention are configured to allow for the main filter chamber and the enhanced filter chamber to be accessed, from a position above the surface water entry orifice and at a time that the filter system is mounted in a storm drain, for repair, maintenance, or replacement of the filters and media in the main chamber filtration and enhanced media filter units of the surface water filtration system.

Certain embodiments of surface water filtration systems also include a sample tube and a sample chamber configured and operative to allow for collecting samples of water that have passed through the surface water filtration system, from a position above the surface water entry orifice and at a time the main filter chamber and the enhanced media are mounted in the storm drain. In such systems, the sample tube typically has a first end, a second end, a width, and an intervening length between the first and second ends, the intervening length sufficient to allow the first end to be inserted into the sample chamber at the same time that the second end is positioned above the top plate of the filtration system. And the sample chamber is shaped for mounting into the storm drain; contains a storage reservoir; is located below the enhanced media filter in the system; and is configured to channel water that has passed through the enhanced media filter into the storage reservoir and allow for the insertion of the second end of the tube into the storage reservoir. Also, the width of the tube is configured to allow for pumping of water samples from the storage reservoir to a collection vessel.

In some embodiments, the perimeter dimensions of the sample chamber are equal to or less than perimeter dimensions of the enhanced media filter. In some embodiments, the storage reservoir comprises a drain. In some embodiments, the storage reservoir further comprises an overflow outlet configured and operative to allow water to bypass the temporary storage reservoir when the storage reservoir is full.

DETAILED DESCRIPTION OF THE INVENTIONS

Certain embodiments of the invention provide surface water filtration systems configured for placement into a storm or sewer drain by, e.g., shaping a filtration system to fit within specific dimensions of individual storm or sewer drain installment sites, with the ability to hang on Z channels, or even L channels, of individual storm drain installment sites or with the ability to mount on the grate frame flange or directly bolt to the wall of the storm drain basin. The larger a storm or sewer drain, the larger the filtration system that may be installed therein; and the hydraulic capacity of a filtration system tends to increase with its size.

In certain embodiments, surface water filtration systems are configured to direct initial water intake through a boom, or ring, of a hydrocarbon medium, which comprises an absorptive or adsorptive material operative to absorb greases, oils, and other hydrocarbons that may be present in surface water runoff, the boom, or ring, mounted in or on a top plate of the filtration system. Hydrocarbon "booms" or "rings" may comprise various sizes and shapes, including square, triangular, rectangular, oval, or circular shapes, and combinations thereof, and may be configured for mounting into an interior or around a perimeter region of the top plate. Examples of absorptive hydrocarbon mediums useful in hydrocarbon booms, or rings, include monopolymers or copolymers of styrene, pentadiene, cyclopentadiene, butylene, ethylene, isoprene, butadiene, and propylene. Examples of adsorptive hydrocarbon mediums useful in hydrocarbon booms, or rings, include paper products, peat, vermiculites, sands, oleophilic clays, tree barks, and silicates. In some embodiments, a hydrocarbon ring or boom of the filtration system is secured to a top plate by one or more means, such as welds, bolts, screws, clamps, tongues, grooves, rivets, drive pins, glues, adhesives and the like.

In some embodiments, the top plate of the filtration system is cut to fit, in an overlapping manner, an opening of a storm or sewer drain; and a main chamber of the filtration system is secured to the top plate by one or more means, such as welds, bolts, screws, clamps, tongues, grooves, rivets, drive pins, glues, adhesives and the like. In some embodiments, the size of the main chamber of a filtration system to be attached to the top plate is tailored to fit within width and depth dimensions of the storm or sewer drain into which the filtration system is to be installed.

In some embodiments, the hydrocarbon ring is adjustable up or down, relative to the top plate, to provide for the achievement of optimal amounts of total surface water entering the filtration system flowing through the hydrocarbon ring. In some embodiments, a high-flow bypass opening is located below the hydrocarbon ring and operative to prevent backflow of water from the filtration system when the water intake rate exceeds the capacity of the filtration system. In some embodiments, a splash shield extends approximately an inch into the main chamber for the full perimeter and is operative to prevent re-suspension of larger materials that have entered the filtration system.

In some embodiments, filtration systems comprise two or more levels of filtration in the main chamber of the filtration system, depending on the desired capacity to physically screen or filter out undesired material carried by surface water that enters the filtration system. Such multi-filter filtration systems typically comprise filters made of non-ferrous, perforated metal or wire mesh, but other materials such as plastic or wood may be used to form perforated or mesh filters. In some embodiments, the filters that comprise such two or more levels of filtration are vertically tiered in the main chamber of the filtration system and operative to provide graduated filtration of material carried by water into the filtration system, by particle size and from top to bottom in the main chamber of the filtration system. For instance, a top filtration level can be configured to filter out the largest particles or debris present in water that enters into the filtration system and the successively lower filtration levels configured to filter out successively smaller particles.

Main chambers, at time referred to as main filter chambers or filter chambers, useful in the present invention can be made in various shapes and therefore comprise various numbers of side walls. For example, filter chambers can be oblong, oval, circular, or barrel shaped and comprise one side wall. Filter chambers can also comprise three side walls and be triangularly shaped. Filter chambers can also be square or rectangular in shape and comprise four side walls. Filter chambers useful in the present invention can comprise even greater numbers of side walls and the shapes associated therewith. The sidewalls of main chambers useful in the invention define an inner space of the main chamber, and the sidewalls can comprise vertically tiered filters. In some embodiments, a sidewall of a main chamber comprises an opening, which can be referred to as a high-flow bypass, that lacks any filter through which water may flow unfiltered, such openings are typically located toward an upper portion of the sidewall and operative to prevent backup of water in the storm during periods of high surface water intake into the storm drain filtration system of which the main chamber is a part. In some embodiments, main chambers of the invention can comprise a bottom wall that comprises an opening, which may be fitted with a filter. In some embodiments, the main chamber comprises a simple opening in lieu of a bottom wall.

In some embodiments, an enhanced media filter, as described herein, and a main chamber are configured such that surface water runoff that enters into the inner space of the main chamber is channeled to initially flow directly into the enhanced media filter and then, in the event of a backup of water waiting to enter the enhanced media filter accumulating in the inner space to a level of a sidewall of the filter chamber at which a filter or a high-flow bypass is located, flow through the filter and/or the high-flow bypass and out of the main chamber via a route that bypasses the enhanced media chamber. In some embodiments an enhanced media filter, as described herein, and a main chamber are configured such that surface water runoff that enters into the inner space of the main chamber is channeled to flow first through one or more filters located in one or more sidewalls of the main chamber and then into the enhanced media filter.

To achieve or exceed compliance with higher environmental regulation standards imposed by NPDES, including standards regarding amounts of fine sediment, dissolved pollutants, metals, nutrients, and bacteria transported into watersheds by surface water flows, embodiments of the invention provide filtration systems that comprise, in addition to the above-described main top plate and chamber filtration assembly and optional hydrocarbon ring, an enhanced media filter. Enhanced media filters are typically located below the main chamber filter assembly in a tiered configuration that facilitates the flow therethrough of all or substantially all of the surface water that flows through a main chamber of the filtration system. Enhanced media filters typically comprise solid state or granular media. Examples of solid state media include spun fibers of organic and inorganic material that resemble a fabric or insulation. Examples of granular media include perlite, zeolite, carbon, ceramic aggregate, activated alumina, and sand. The solid state or granular media are operative to filter, or utilize seepage to capture, and thereby remove, from water that flows through enhanced media filters, amounts of fine sediment, dissolved pollutants, metals, nutrients, and bacteria required to meet the standards imposed by NPEDES, yet still provide desirable hydraulic capacity. In some embodiments, enhanced media filter units are sized and shaped to substantially have the same general shape and dimensions, or exactly have the same general shape and dimensions, of s main filter chamber of the filtration system.

In some embodiments, enhanced media filters comprise a plurality of solid state or granular media, in a layered configuration. Such enhanced media filters can comprise two, three, four, five, or more layers of solid state or granular media. In some embodiments, filtration systems and enhanced media filters therein are configured to allow for facile maintenance, cleaning, and/or replacement of the enhanced media filter units as a whole or of the solid state or granular media layers or materials.

In some embodiments, a bottom wall of an enhanced media filter can comprise one or more perforated or mesh filters of various sieve sizes configured to further capture finer particle sediments in the enhanced media filter portion while allowing water to drain out.

In some embodiments, a main chamber of the filtration system is secured to an enhanced media filter by one or more means, such as welds, bolts, screws, clamps, tongues, grooves, rivets, drive pins, glues, adhesives and the like.

Some embodiments of the invention provide filtration systems that comprise, in addition to the above-described top plate, main chamber filtration assembly, enhanced media filter, and optional hydrocarbon ring, a storage chamber configured to hold water that has been fully filtered by the filtration system in a manner that it may be accessed to obtain samples for quality testing. Sample chambers are typically located below the enhanced media filter in a vertically tiered configuration that facilitates the flow thereinto of at least a portion of the water filtered by the main chamber filter and/or enhanced media filter. In some embodiments, sample chambers are sized and shaped to substantially or exactly match the main chamber and/or the enhanced media filter unit(s) of the filtration system. In some embodiments, sample chambers have a depth of approximately a few inches. In some embodiments, sample chambers are operative to temporarily hold water that has been fully filtered by the filtration system, and such operation can be achieved by configuring sample chambers with a drain, which may be reversibly closable and which may be sized to provide a desired drainage rate of fully filtered water out of the sample chamber. Drains suitable for such purposes include a small 'weep' hole, a drain down orifice, or a similar opening that allows that water that has collected to empty out of the sample chamber, after a lengthy amount of time, in order to limit any standing water and associated vector issues. In some embodiments, sample chambers are configured to have an end of a tube inserted therein, and the other end of the tube positioned above the filtration system for easy pumping of water out of the sample chamber into a collection apparatus, such as a jar, bottle, test-tube, vial, or the like.

In some embodiments, a sample chamber of the filtration system is secured to an enhanced media filter by one or more means, such as welds, bolts, screws, clamps, tongues, grooves, rivets, drive pins, glue, adhesives and the like.

The vertically tiered configuration of the main filter chamber, the enhanced media filter, and optional the sample chamber and hydrocarbon ring provided by certain embodiments of filtration systems of the invention typically allows such systems to filter surface water entirely by the force of gravity, and not by the use of a pump, although such a pump can be used.

Certain embodiments of the invention provide modular filter systems, for insertion into a storm drain pipe, or catch basin, that filter liquid runoff. Storm water or other runoff will flow through such filter systems prior to passing into the sanitary sewer and/or into oceans, lakes, streams, ponds, or other water ways. In some embodiments, the filtration system contains a flange that connects it to a storm drain structure and a main filtration chamber that extends down into the storm drain and contains a series of tiered filters in filter chambers. In some embodiments, the system comprises a hydrocarbon media that can be configured for easy replacement once loaded and/or saturated with greases, oils, and/or other hydrocarbon contaminants removed from surface water runoff that entered the filtration system. In certain embodiments, overflow opening(s) are located at the upper portion of a main filtration chamber and operative to prevent backflow from the filtration system during times of heavy surface water runoff entry into the storm drain into which the filtration system is installed. In some embodiments, a second level of filtration uses a physical perforated metal or wire mesh to filter out the largest particles, with the lower more restricting filtration levels filtering out smaller particles. In some embodiments, a media filtration level uses filter media to extract fine particles and sediments via seepage.

FIGS. 1-4 illustrate a prior art storm drain filter system generally according to Kluge. The illustrated system may be constructed from metal, fiberglass, plastic, and/or concrete. In it, a removable top plate FIG. 1 (10) with attached hydrocarbon ring FIG. 1 (12) is attached to the main chamber FIG. 1 (24) of the drain filter system. This top plate sits on a Z channel FIG. 4 (32) which rests on a concrete or metal lip that is part of the existing or new concrete vault and allows the main chamber FIG. 1 (24) of the drain system to hang below the top grate and hang into the open space of the storm drain vault. The top plate FIG. 1 (10) can be detached from the main chamber FIG. 1 (24). The top plate FIG. 1 (10) is manufactured oversized and can be easily cut down to fit various concrete vaults. Once the top plate FIG. 1 (10) with the attached hydrocarbon ring FIG. 1 (12) is cut to the correct size, the main chamber FIG. 1 (24) is attached to the top plate and is ready for installation into the vault. Water, which flows into the storm drain, is directed to the hydrocarbon medium, FIGS. 1, 2 and 4 (12). The water flows through this hydrocarbon medium allowing for filtration of hydrocarbons, oils and other substances.

Figure 1:
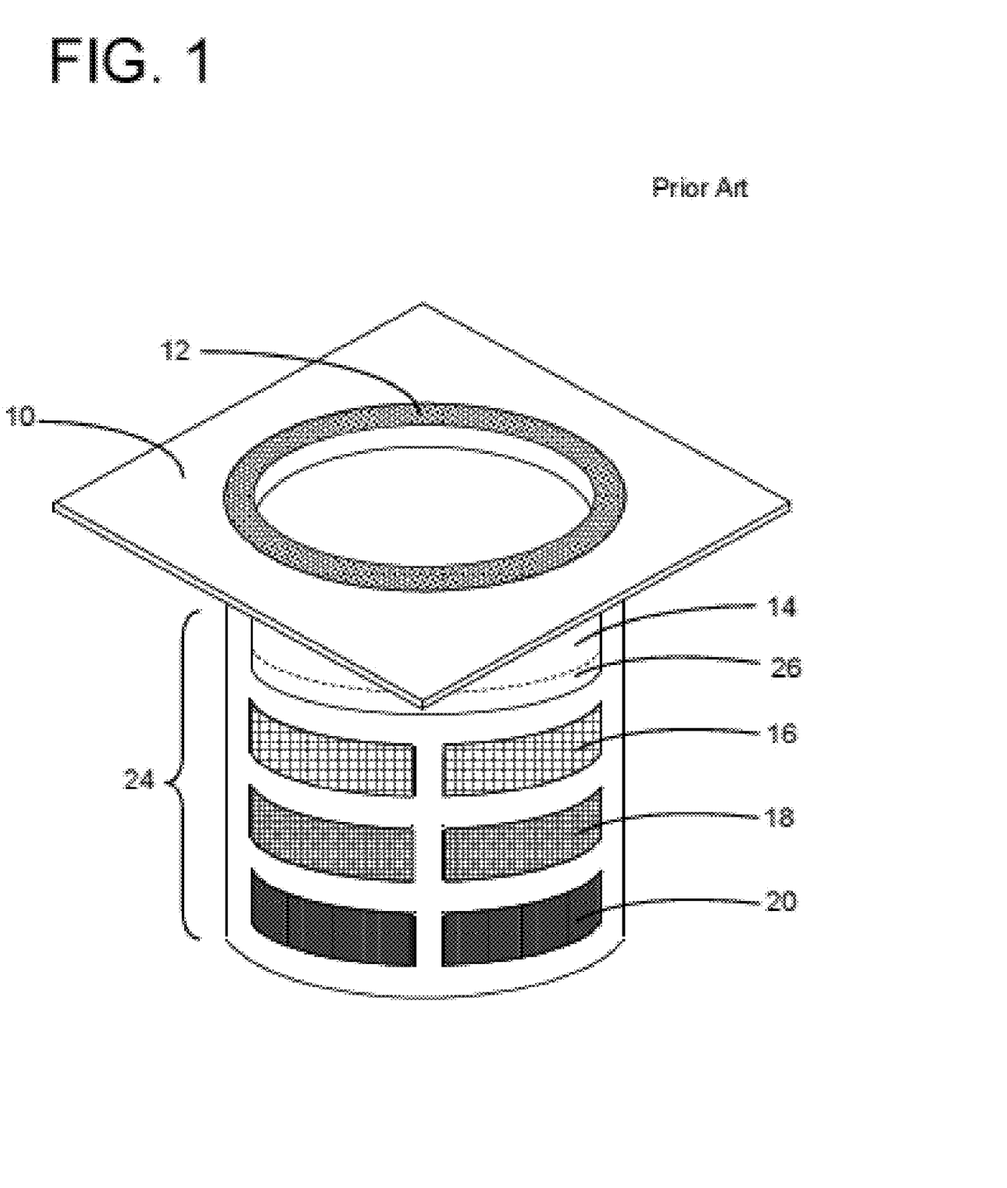
FIG. 1 is a perspective view of a prior art storm drain filter system.
Figure 2:
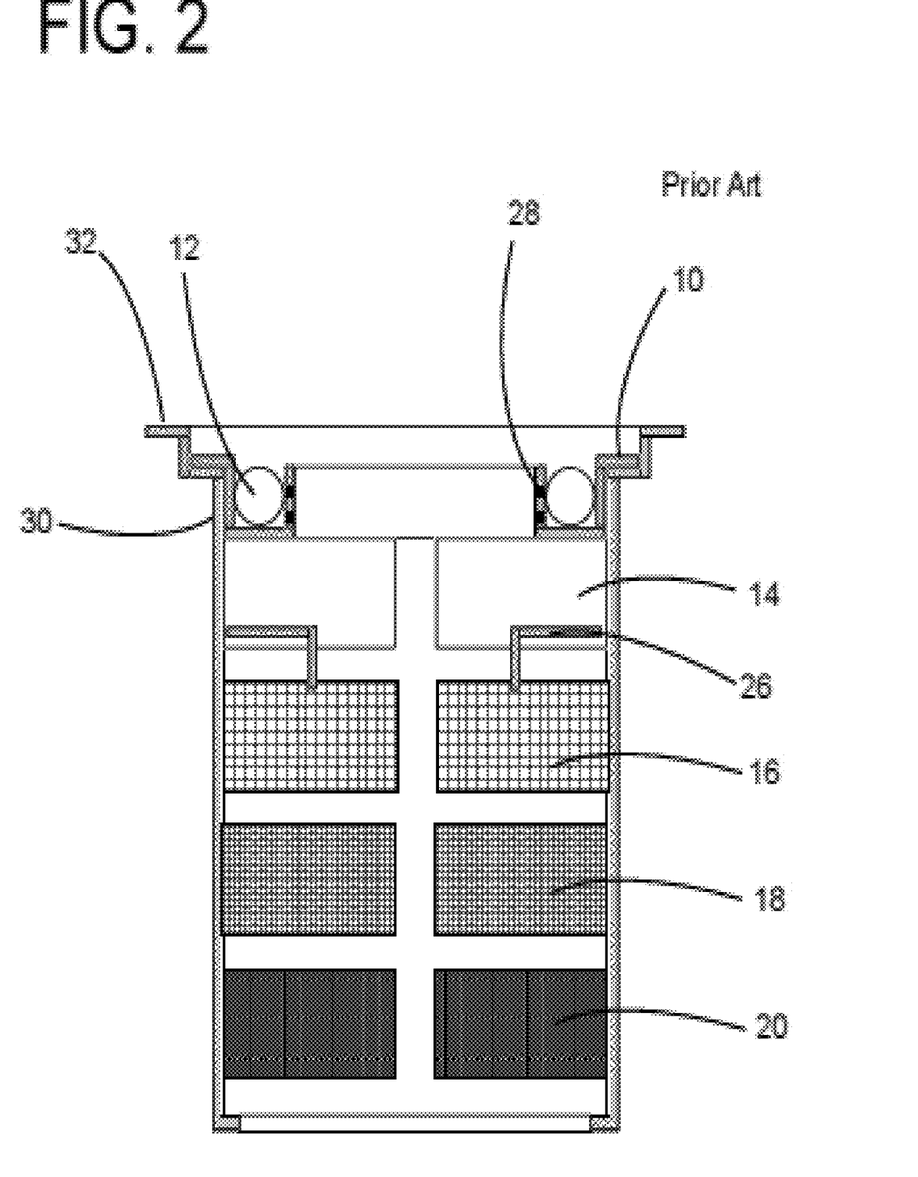
FIG. 2 is a perspective view of a prior art storm drain filter system.

As shown, the storm drain system includes a main chamber FIG. 1 (24) which is generally shaped to specific dimensions to suit individual site requirements. This main chamber is split into various levels of filtration. The chamber shown has more than one level of filtration FIGS. 1 and 2 (16, 18, 20). Water flows through the hydrocarbon medium FIGS. 1 and 2 (12) and then through the multiple levels of physical screening filtration. During times of excessive runoff this system is equipped with a high flow bypass FIGS. 1 and 2 (14). This bypass allows water and large particles of debris to escape so that the filter system does not become backed up during higher flows. The system also contains a splash shield FIG. 1 (26) which extends from the inner perimeter edge of the chamber approximately 1 to 3 inches into the chamber. This splash shield prevents trash from re-suspending and escaping out of the filter. In normal flow conditions, water flows through the hydrocarbon medium (12) and drops as far as it can within the cavity basket, which here is the highest restrictive screening filtration level, FIGS. 1 and 2 (20) and FIG. 3 (22), which is also equivalent to just above the removable perforated metal top cover for the enhanced media filtration portion. As the unit fills up to the next upper lesser restrictive screening level of filtration (18) larger particles of sediments and debris are captured until the water level reaches the least restrictive level of screening filtration (16) which contains perforated holes. Once this level is impacted and can no longer allow water to flow out of the restricting screening filtration levels of the unit, the water passes through the high flow bypass FIG. 1 and FIG. 2 (14).

Figure 3:
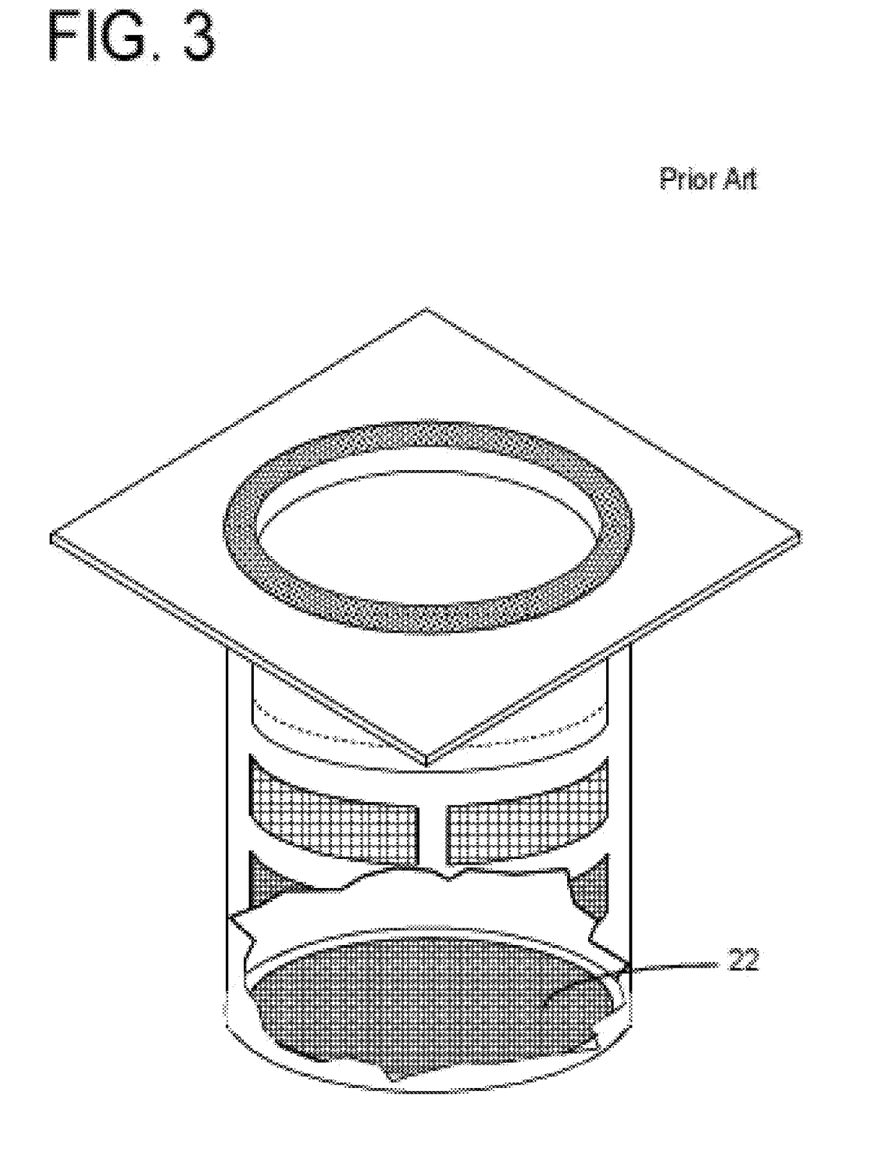
FIG. 3 is a perspective view of a prior art storm drain filter system in partial cutaway to expose the system's bottom plate portion.
Figure 4:
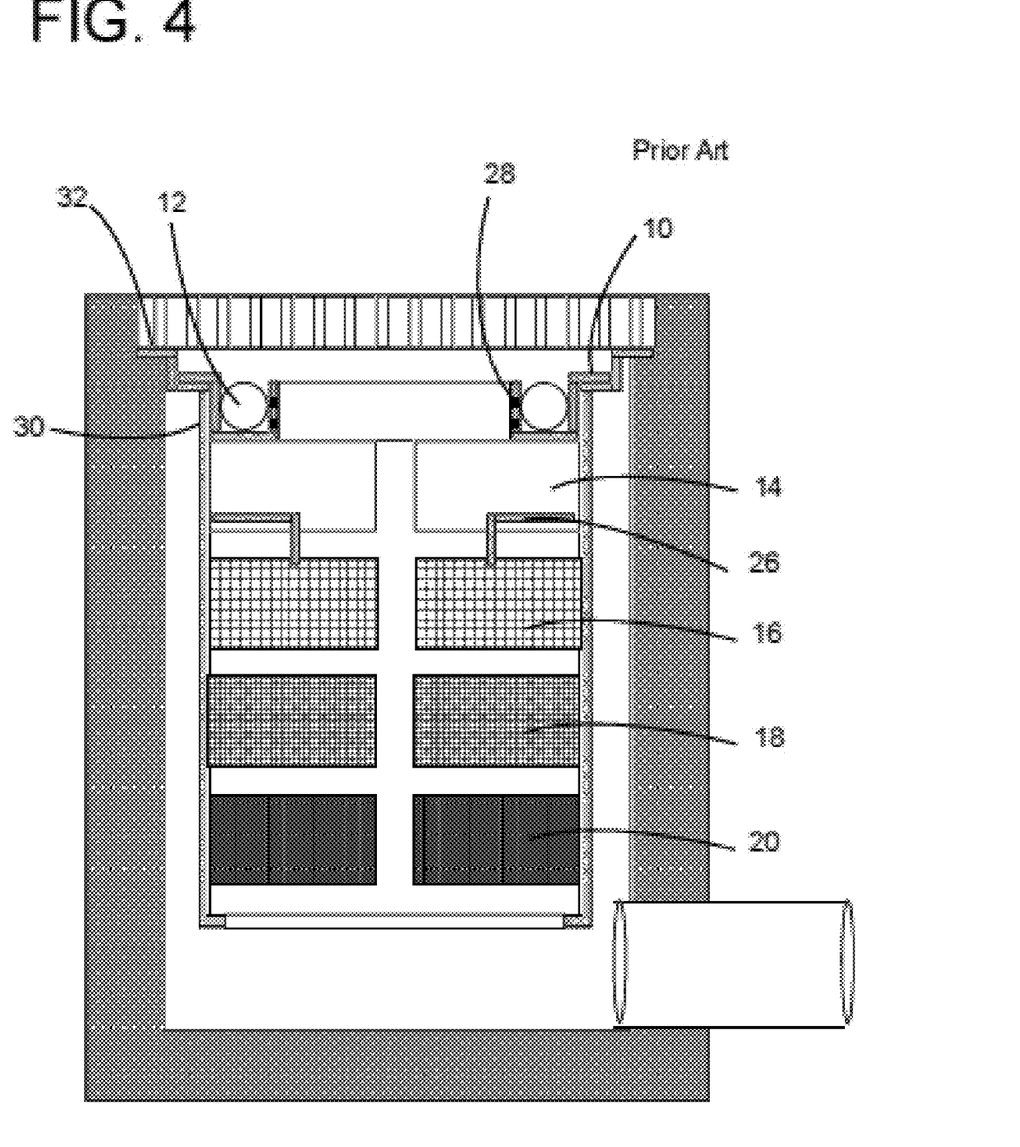
FIG. 4 is a side plan view of a prior art storm drain filter.

FIG. 3 shows a bottom fixed level of perforated metal (22) of the main chamber FIG. 1 (24) of the drain filter system.

Figure 5:
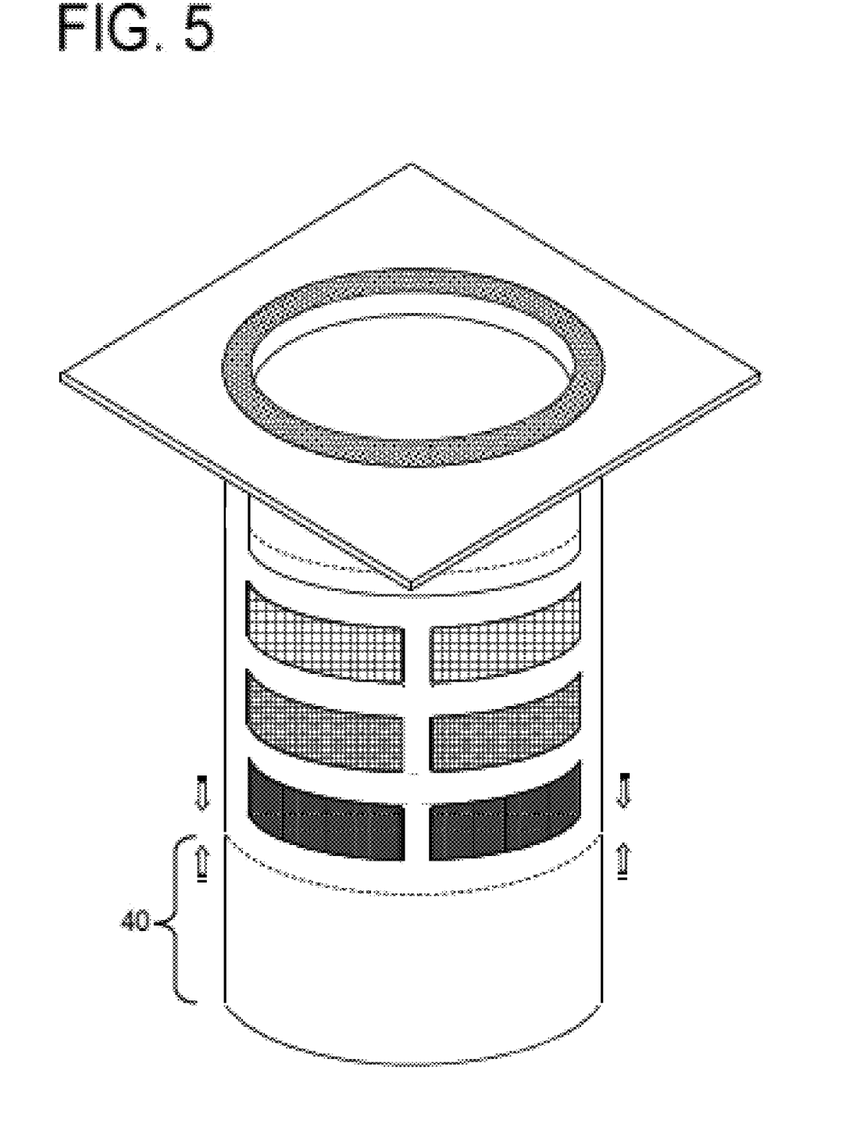
FIG. 5 is a perspective view of a storm drain filter system according to the present invention.

FIGS. 5-14 illustrate an embodiment of the present invention. Referring to FIG. 5, an enhanced media filter portion (40) extends down from the main chamber (24) in the Z direction. The depth of the enhanced media filter portion (40) is not limited to any set value, but may be determined by drainage dimensions. A perimeter of an inner and/or outer wall of the enhanced media filter portion (40) substantially or exactly matches a perimeter of an inner and/or outer wall, respectively, of the enhanced media filter portion (40) of the main chamber (24). All walls of the enhanced media filter portion (40) are substantially or entirely solid and non-perforated.

Figure 6:
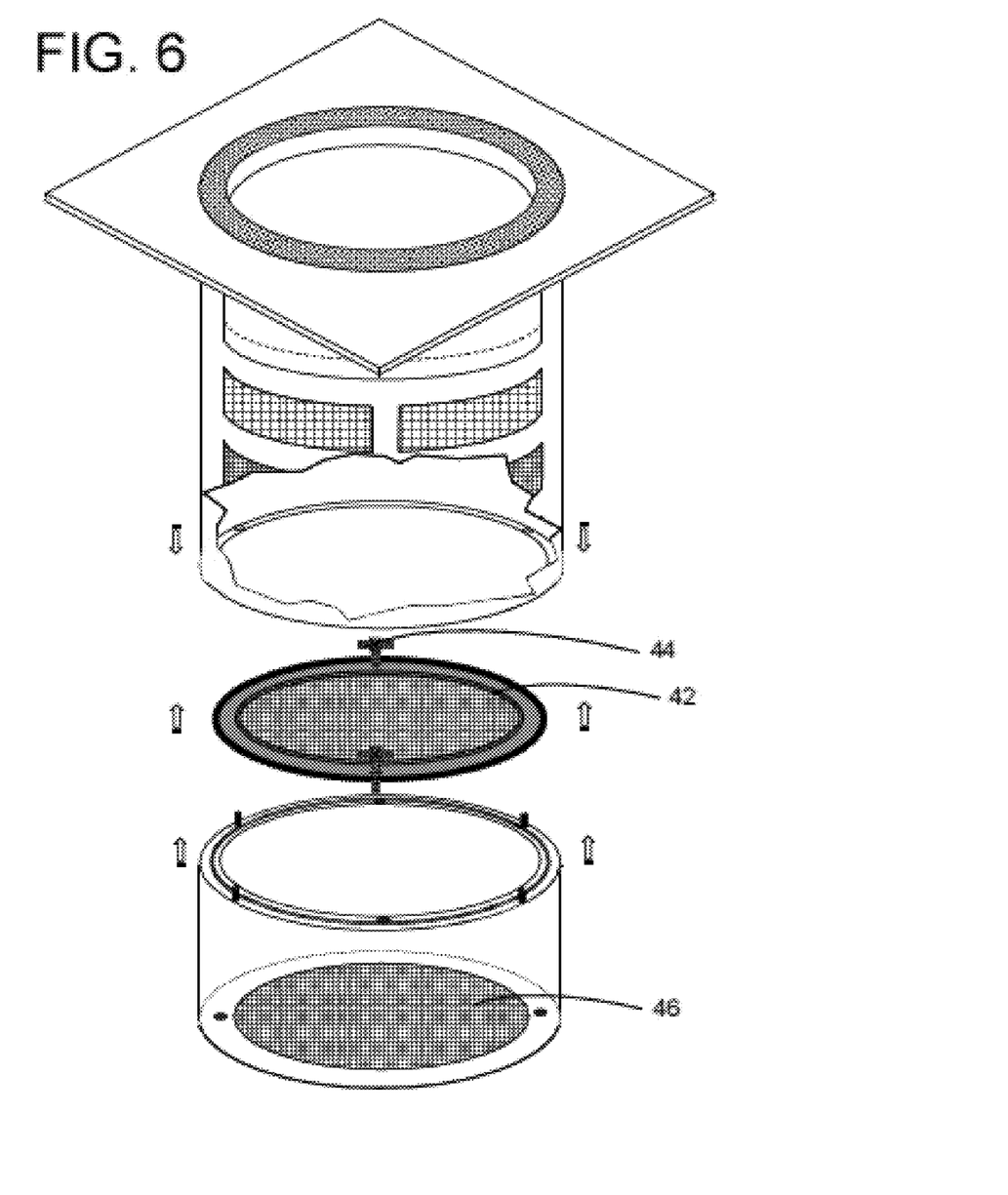
FIG. 6 is a perspective view of a storm drain filter system in partial cutaway to expose the removal and replacement of the prior art's bottom plate with the media filtration's removable top plate according to the present invention.

FIG. 6 illustrates a removable, mesh screen top cover (42) for the enhanced media filter portion (40). In FIG. 6, a bottom (46) of the enhanced media filter portion (40) comprises a screen filter configured to further capture finer particle sediments in the enhanced media filter portion (40) while allowing water to drain out.

Figure 7:
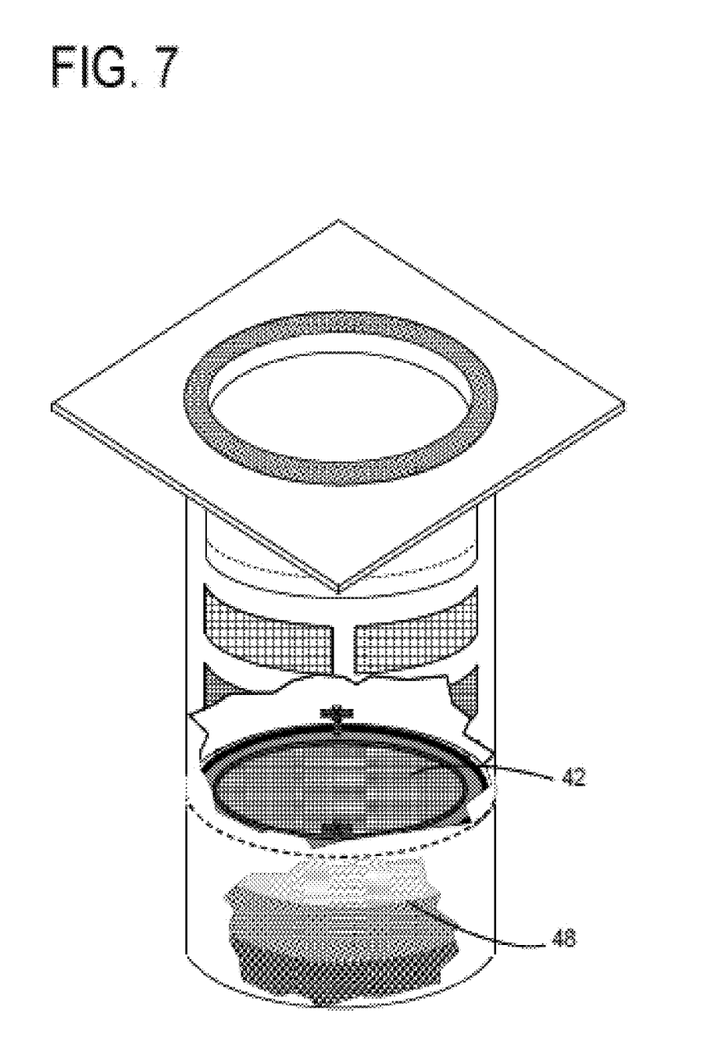
FIG. 7 is a perspective view of a storm drain filter system in partial cutaway to expose the media filtration and its granular and solid state material in relation to its removable top plate according to the present invention.

FIG. 7 illustrates that an inner cavity (48), of the enhanced media filtration portion (40), comprises a plurality of solid state or granular media layers.

Figures 8A, 8B:
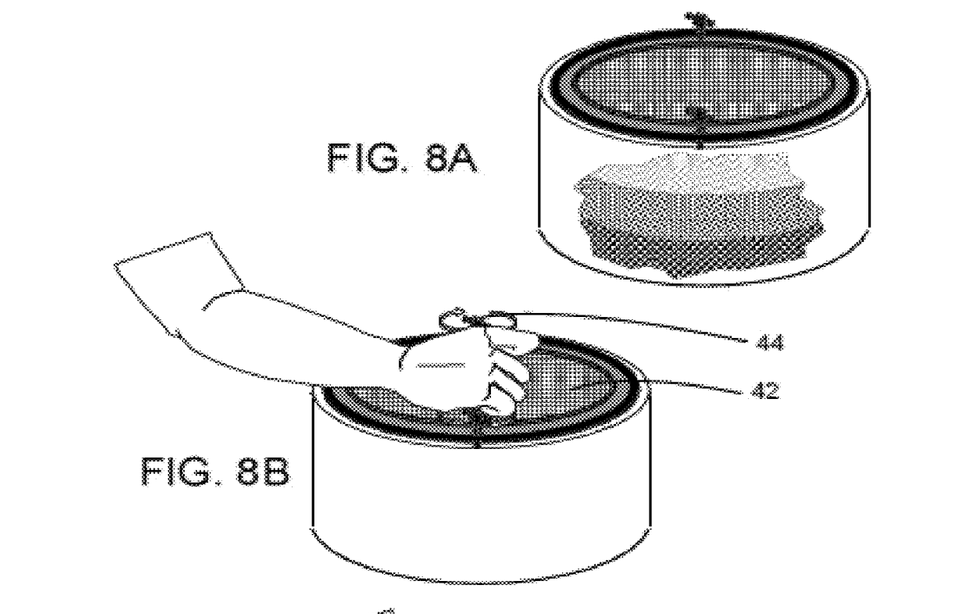
FIG. 8 is a perspective view of a storm drain filter system in partial cutaway to show the removability of the media filtration's removable top plate according to the present invention.
Figure 8C:
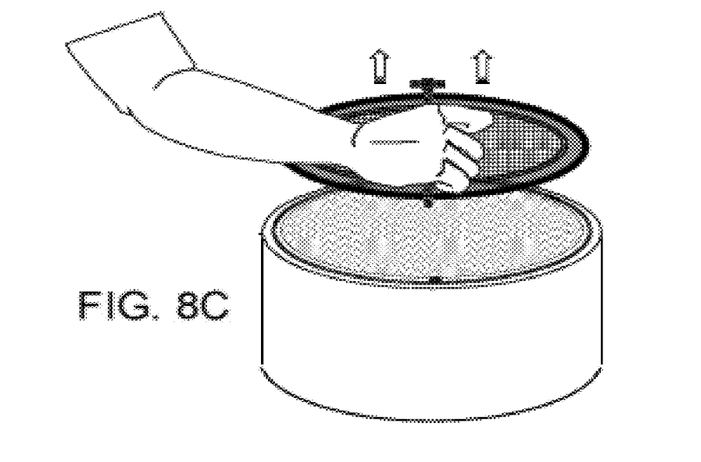

FIGS. 8A, 8B, and 8C illustrate the simple ease to remove the perforated top cover (42) for the enhanced media filter portion (40) and replace the inner contents of the enhanced media filter portion (40). FIG. 8A displays an isometric view of how the perforated top cover (42) fits above the enhanced media filter portion (40) and its contents. FIG. 8B displays that the perforated top cover (42) can be twisted or pulled on its handles (44). FIG. 8C shows that the top cover (42) is configured to allow for easy removal of the perforated top cover (42) to expose the inner cavity of the enhanced media filter portion (40) and its contents.

Figure 9:
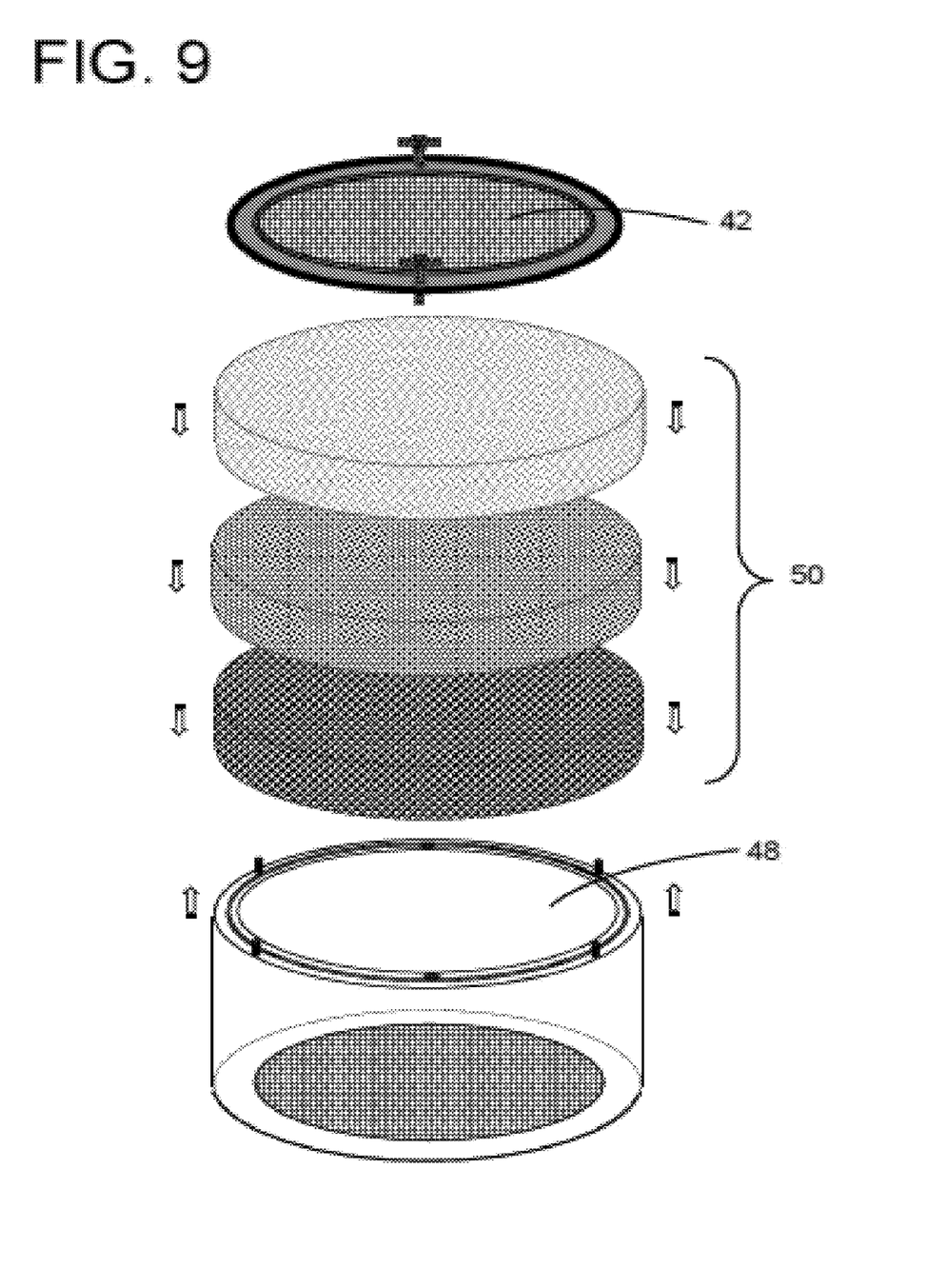
FIG. 9 is a perspective view of a storm drain filter system in partial cutaway to expose the media filtration and its multiple levels of granular and solid state material in relation to its removable top plate according to the present invention.

FIG. 9 illustrates that inner cavity (48), of the enhanced media filter portion (40), is configured to be filled with three layers of solid state or granular media (50) and covered by a mesh top cover (42).

Figure 10:
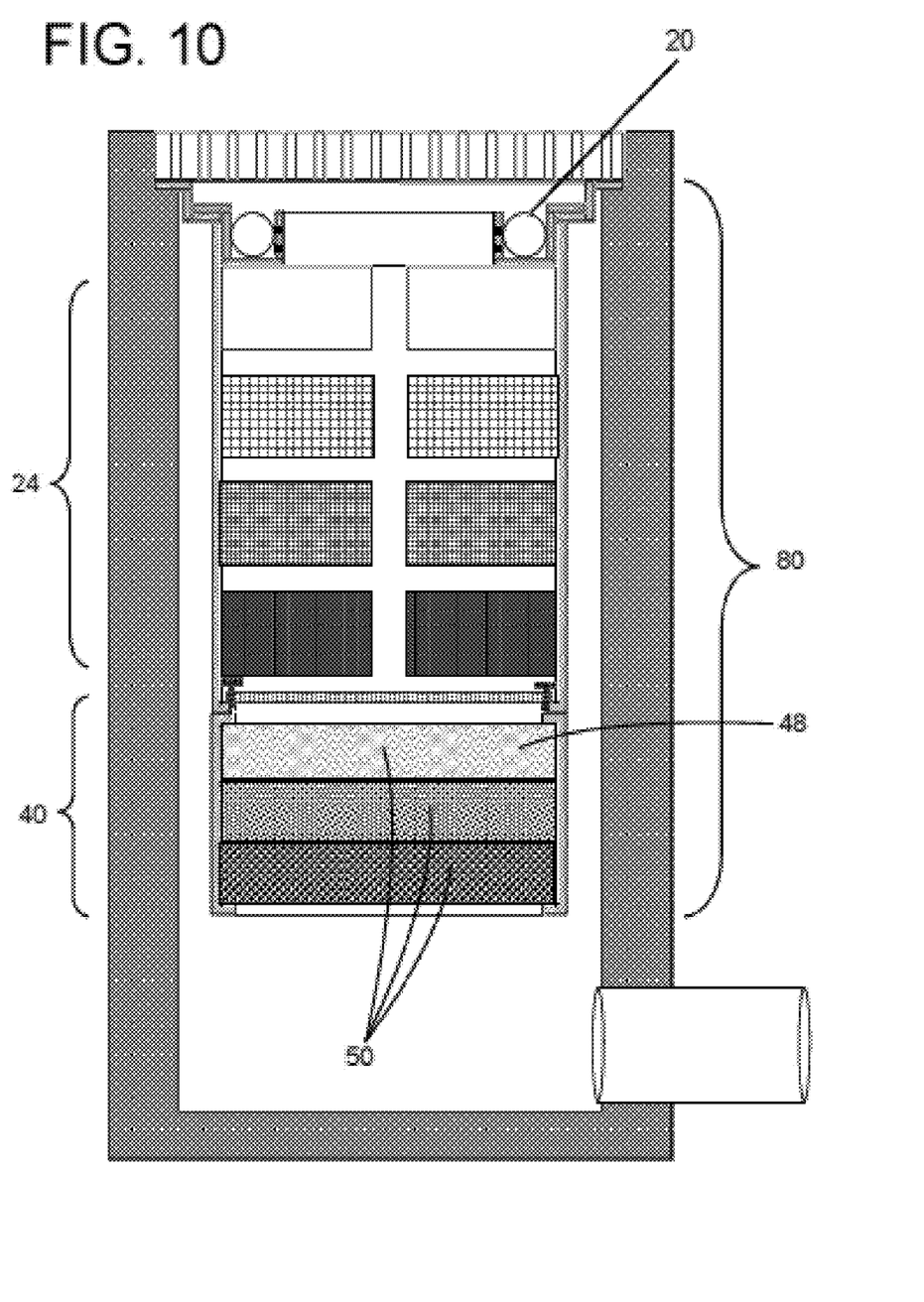
FIG. 10 is a side plan view of a storm drain filter system according to the present invention.

FIG. 10 illustrates in plan view the connectivity of the main chamber (24) with the enhanced media filter portion (40) that is found directly below it. Any storm water first passes through the hydrocarbon boom, or ring, (20) and then falls through the main chamber (24) and enters the inner cavity (48) of the enhanced media filter portion (40). Storm water that enters the inner cavity (48) of the enhanced media filter portion (40) then seeps through the solid state or granular media (50), and such seepage captures and/or sequesters water-borne fine sediments.

Figure 11:
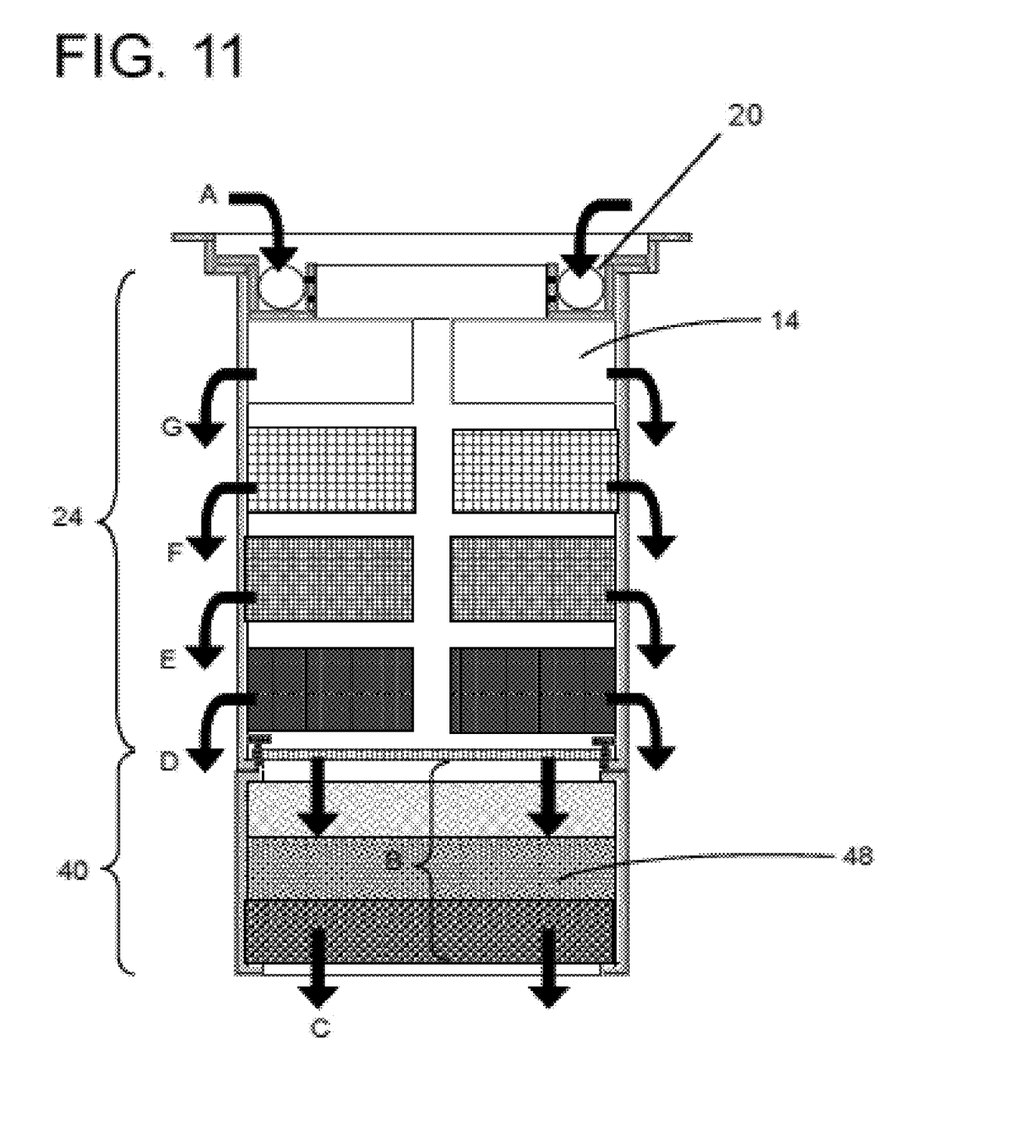
FIG. 11 is a side plan view of a storm drain filter system according to the present invention that shows, in a step-by-step fashion, a preferred storm water flow through the storm drain filter system.

FIG. 11 diagrams step by step operation of how the storm water passes through the main chamber (24) and an enhanced media filter portion (40) of the present invention. The capital letters A to G are used to indicate these steps and black arrows are used to illustrate water flows. The storm water initially passes through 'A', the hydrocarbon boom, or ring, (20) and falls and passes through three layers of media and the screen, labeled 'B' and 'C' respectively, in the enhanced media filter inner cavity (48). With increased storm water flow rates, increased backed up water could flow through filters labeled 'D', 'E' and 'F' in chamber (24). With excessive flow rates, the remaining storm water flows out of the storm drain system near 'G' by the bypass (14).

Figure 12:
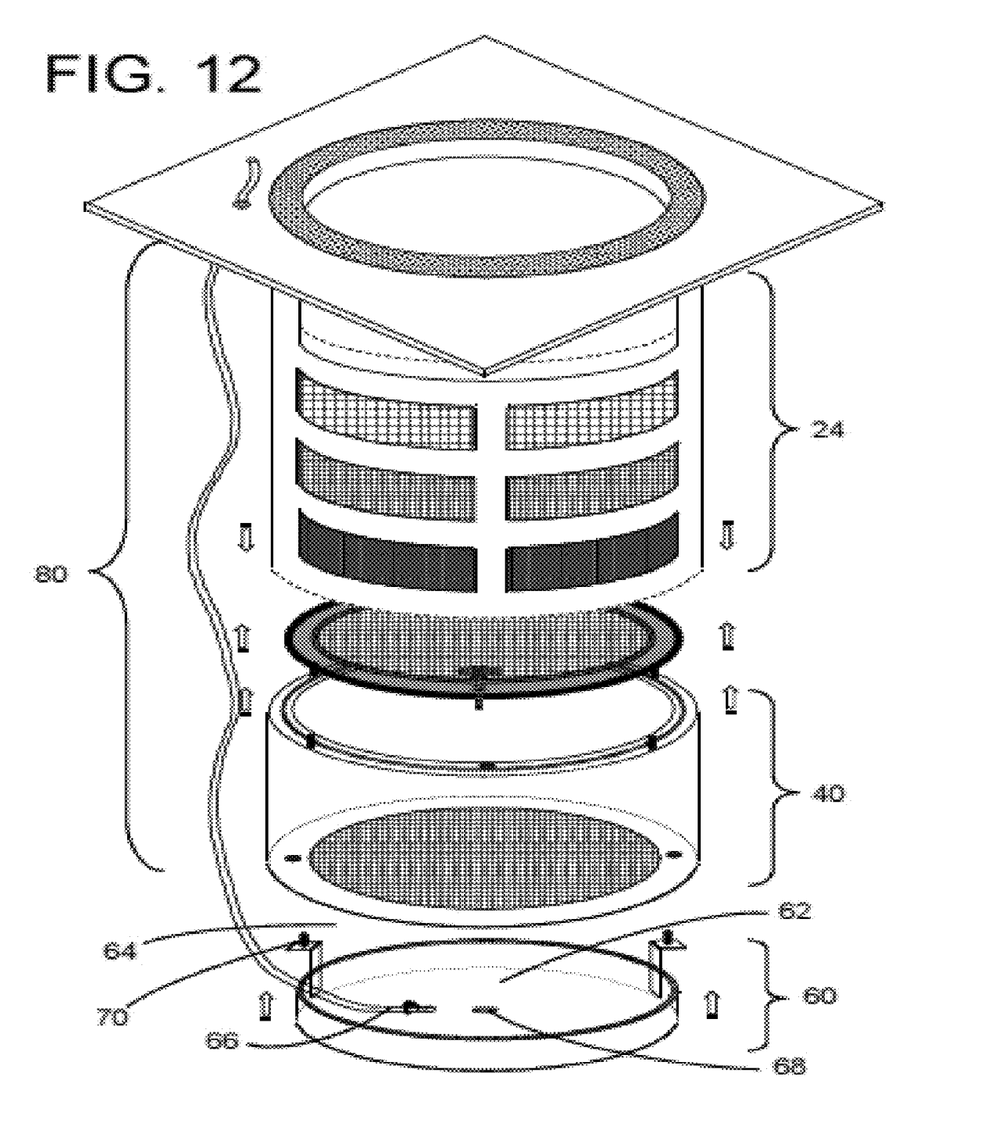
FIG. 12 is a perspective view of a storm drain filter system according to the present invention that has a temporary storage reservoir for system runoff attached underneath the media filtration portion and its removable top plate.

FIG. 12 illustrates a surface water drainage system that comprises, at the bottom of the enhanced media filter portion (40), a sample chamber (60) configured to form a storage cavity (62) operable to act as a temporary reservoir of fully filtered storm water that has passed through the storm drain filter system (80). The depth of the sample chamber (60) is not limited to any specific value. A circumference of an inner or outer wall of the sample chamber (60) substantially or exactly matches the circumference of an inner or outer wall of the enhanced water filter portion (40). A high-flow bypass opening (64) that can measure from about ¼ inch to several inches in width separates the sample chamber (60) from the enhanced media filter portion (40). The sample chamber (60) is attached to the enhanced media filter portion (40) by a hinged nut and bolt assembly (70) affixed to walls of the sample chamber (60). A tube (66) having one end inserted into the sample chamber (60) and the other end above the top plate (10) is configured to provide for removal of liquid held the sample chamber (60) for, e.g., quality testing. A drain hole (68) in a bottom wall of the sample chamber (60) allows filtered water to flow out of the sample chamber (60) and into the drain.

Figure 13:
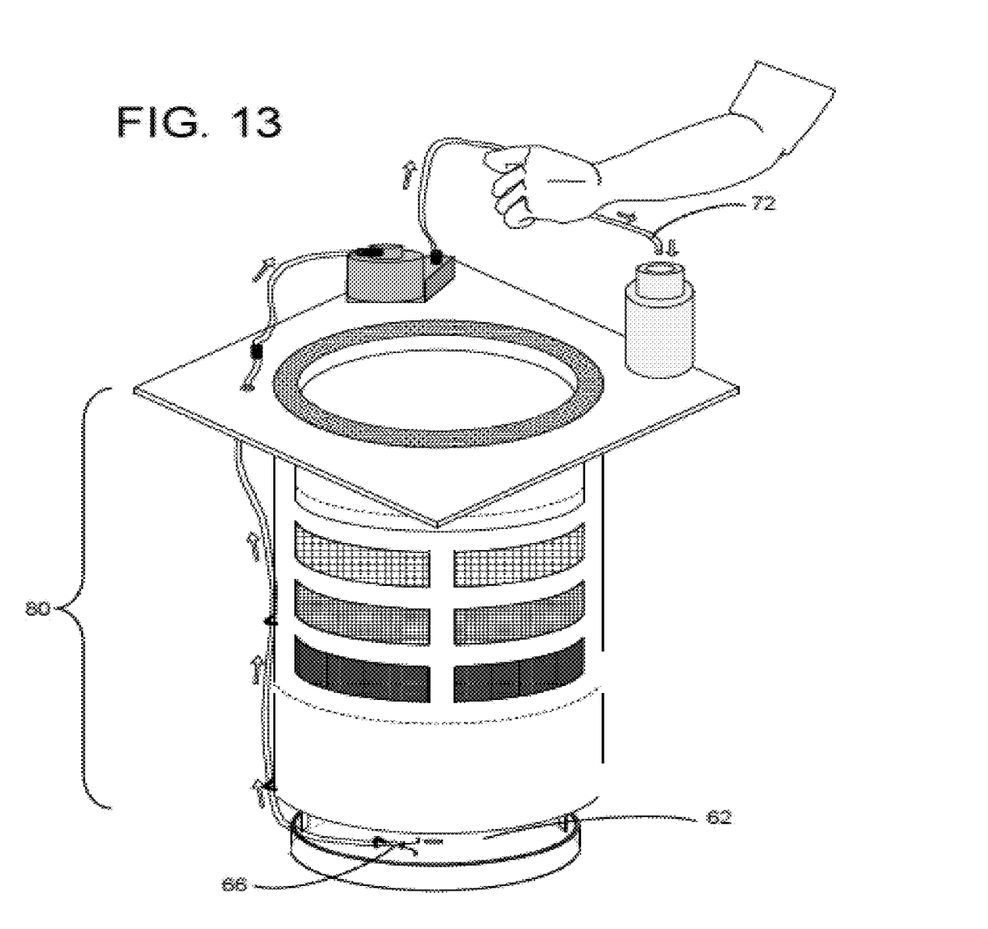
FIG. 13 is a perspective view of a storm drain filter system according to the present invention with a temporary storage reservoir and its attached tubing running from the reservoir to the top of the system for testing the runoff water.

In FIG. 13, one opening of the tube (66) is embedded into the storage cavity (62) and the other end of the tube (72) is located above the storm drain filter system (80), a configuration that allows for removal of fully filtered water from various means to extract an amount of filtered storm water in order to perform the required testing.

Figure 14:
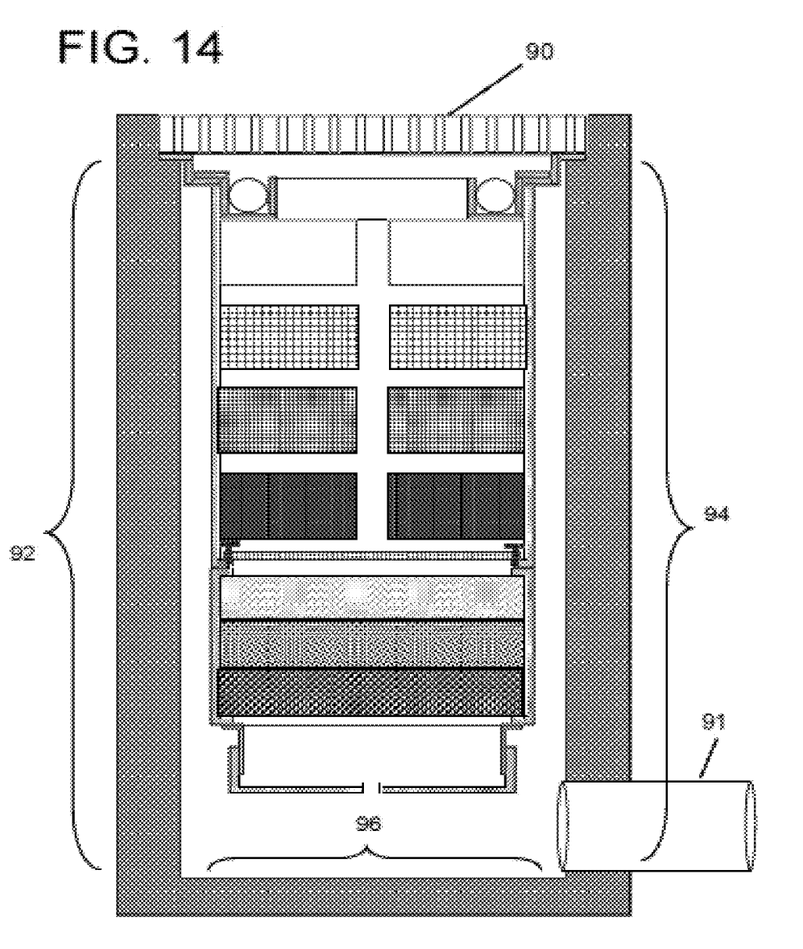
FIG. 14 is a side plan view of a storm drain filter system according to the present invention installed into a storm drain vault.

FIG. 14 shows the system when installed in the storm drain, with the metal grate (90) and with three storm drain walls, (92), (94), and (96), on left, right, and a storm drain pipe (91).

Some storm drain filters systems of the invention can be cleaned without removal of the unit from the storm drain, with this done by any means, including by hand, shop vacuum, or even a vacuum truck.

Although the disclosure has been provided in the context of certain embodiments and examples, and certain aspects, parts, and/or features of embodiments of the invention illustrated in the Figures, it will be understood by those skilled in the art that the disclosure extends beyond the specifically described embodiments to other alternative embodiments, obvious modifications, and equivalents thereof. The invention is not limited by the specific disclosures of embodiments herein.

What is claimed is:

1. A system, for filtering surface water runoff, that comprises a top plate, a main filter chamber, an enhanced media filter, a sample tube, and a sample chamber, wherein:
   the main filter chamber and the enhanced media filter are shaped for mounting into a storm drain that comprises a surface water entry orifice;
   the top plate is shaped to fit within a perimeter of the surface water entry orifice and comprises a surface water intake opening;
   the top plate, the main filter chamber, and the enhanced media filter are positioned in the system such that the enhanced media filter is below the main filter chamber and the main filter chamber is below the top plate;
   the main filter chamber comprises one or more vertically tiered filters in a side wall of the main filter chamber;
   the main filter chamber is configured to channel surface water, which has passed through the surface water intake opening, through the one or more filters operative to provide a filtration of particulate materials out of the surface water;
   the enhanced media filter comprises at least one layer comprised of a solid state media or a granular media and is configured to channel surface water that has passed through the main filter chamber through the at least one solid state or granular layer, which is operative to remove from the surface water that flows through the enhanced media filter substantial amounts of suspended or dissolved fine sediments, pollutants, metals, nutrients, bacteria, pesticides, hydrocarbons, organics, oxygen demanding substances, hydrocarbons, biological oxygen demand, chemical oxygen demand, or combinations thereof;
   the sample chamber: is attached to the bottom of the enhanced media filter; comprises a storage cavity; is located below the enhanced media filter; and is configured to channel water that has passed through the enhanced media filter into the storage cavity and to allow for the insertion of the second end of the tube into the storage cavity;
   the sample tube comprises a first end, a second end, a width, and an intervening length between the first and second ends, the intervening length sufficient to allow the first end to be inserted into the sample chamber at the same time that the second end is positioned above the top plate;
   the width of the tube is configured to allow for facile pumping of water samples from the storage reservoir to a collection vessel; and
   the sample tube and the sample chamber are operative to allow for collecting, from a position above the surface water entry orifice and at a time the main filter chamber and the enhanced media are mounted in the storm drain, a sample of water that has passed through the enhanced media filter of the system.

2. The system of claim 1, wherein the main filter chamber comprises two or more filters in a vertically tiered arrangement, from bottom to top, of increasingly finer perforation or mesh, and wherein the vertically tiered arrangement is operative to provide a graduated filtration of particulate materials out of the surface water, and wherein the two or more filters are comprised of perforated metal, perforated plastic, perforated wood, wire mesh, plastic mesh, or combinations thereof.

3. The system of claim 2, wherein the at least one layer comprises the solid state media, and wherein the solid state media comprises spun fibers of organic and inorganic material that resemble a fabric or insulation.

4. The system of claim 2, wherein the at least one layer comprises the granular media, and wherein the granular media comprises perlite, zeolite, carbon, ceramic aggregate, activated alumina, sand, or combinations thereof.

5. The system of claim 2, wherein the main filter chamber further comprises a main filter chamber high-flow bypass.

6. The system of claim 2, wherein the main filter chamber further comprises a splash shield.

7. The system of claim 2, wherein the top plate further comprises a hydrocarbon ring.

8. The system of claim 2, wherein the enhanced media filter comprises a removable top cover, and wherein the removable top cover is comprised of perforated metal, perforated plastic, wire mesh, or plastic mesh.

9. The system of claim 1, wherein the at least one layer comprises the solid state media, and wherein the solid state media comprises spun fibers of organic and inorganic material that resemble a fabric or insulation.

10. The system of claim 1, wherein the at least one layer comprises the granular media, and wherein the granular media comprises perlite, zeolite, carbon, ceramic aggregate, activated alumina, sand, or combinations thereof.

11. The system of claim 1, wherein perimeter dimensions of the main chamber filter substantially match perimeter dimensions of the enhanced media filter.

12. The system of claim 1, wherein the main filter chamber further comprises a main filter chamber high-flow bypass.

13. The system of claim 1, wherein the main filter chamber further comprises a splash shield.

14. The system of claim 1, wherein the top plate further comprises a hydrocarbon ring.

15. The system of claim 14, wherein the hydrocarbon ring comprises a hydrocarbon medium selected from vermiculites; sands; oleophilic clays; tree barks; silicates; monopolymers or copolymers of styrene, pentadiene, cyclopentadiene, butylene, ethylene, isoprene, butadiene, propylene; and combinations thereof.

16. The system of claim 1, wherein the enhanced media filter comprises a removable top cover, and wherein the removable top cover is comprised of perforated metal, perforated plastic, wire mesh, or plastic mesh.

17. The system of claim 1, wherein perimeter dimensions of the sample chamber are equal to or less than perimeter dimensions of the enhanced media filter.

18. The system of claim 1, wherein the sample chamber comprises a drain.

19. The system of claim 1, wherein the system further comprises a sample chamber high-flow bypass outlet.

* * * * *